D. P. FOSTER.
KETTLE COVER.
APPLICATION FILED FEB. 23, 1909.
932,774.
Patented Aug. 31, 1909.
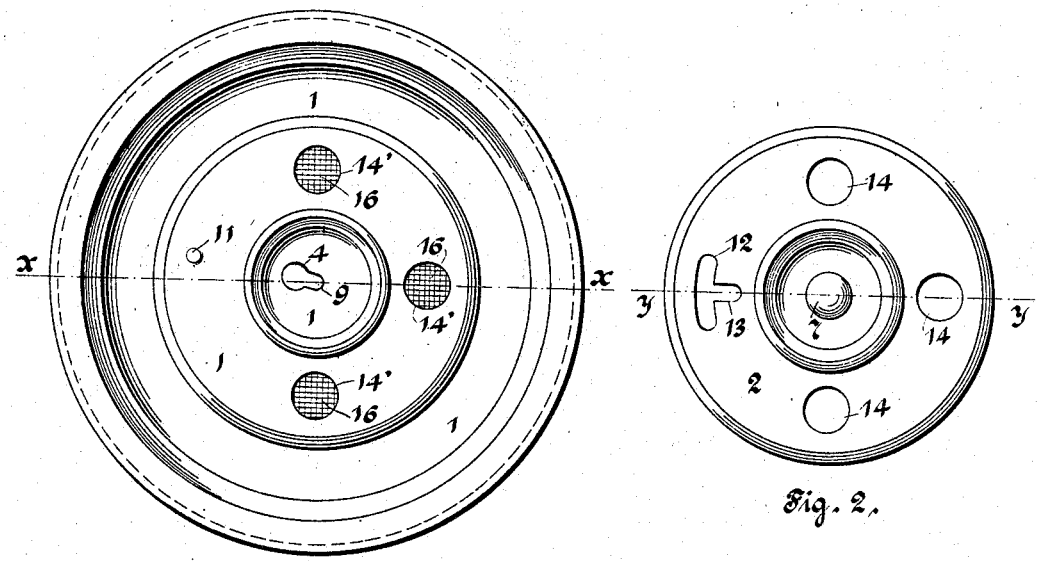
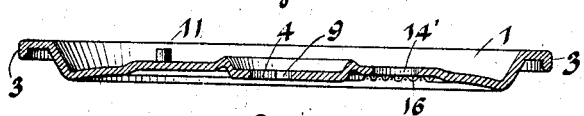
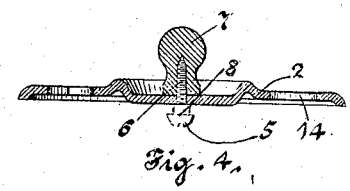
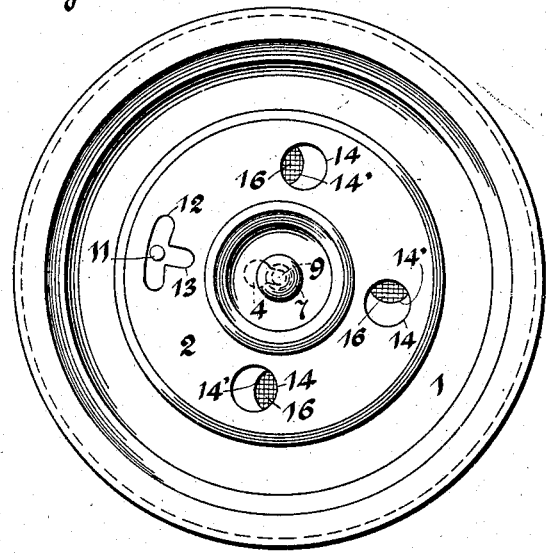
Witnesses:
A. J. Graefe
W. C. Smith
Inventor:
David P. Foster,
by Joshua R. H. Potts
his Attorney.

UNITED STATES PATENT OFFICE.

DAVID P. FOSTER, OF WEST UNION, IOWA.

KETTLE-COVER.

932,774. Specification of Letters Patent. Patented Aug. 31, 1909.

Application filed February 23, 1909. Serial No. 479,657.

*To all whom it may concern:*

Be it known that I, DAVID P. FOSTER, a citizen of the United States, residing at West Union, county of Fayette, and State of Iowa, have invented certain new and useful Kettle-Covers, of which the following is a specification.

My invention relates to covers for kettles or cooking utensils, and has for its object to provide a simple and inexpensive device of this character designed to serve its purpose in the most convenient manner.

A further object of my invention is to provide detachable means in a kettle cover to confine the odors resultant from cooking, and which may be moved at will to allow steam to escape.

A further object is to provide small openings for the escape of steam and to prevent the entrance of dust or insects into the kettle. And a further object is to provide a handle or knob on the detachable portion of the cover adapted to serve not only as a means for removing the cover but as a means for opening and closing the steam passages.

Other objects will appear hereinafter.

With these objects in view my invention consists in such a novel construction and arrangement of parts all as will be hereinafter fully described and particularly pointed out in the appended claims.

My invention will be more readily understood by reference to the accompanying drawings forming a part of this specification, and in which, Figure 1 is a top or plan view of a kettle cover showing the same with the detachable plate removed, Fig. 2 is a top elevation of the detachable plate, Fig. 3 is a sectional view taken on line $x$—$x$ of Fig. 1, Fig. 4 is a sectional view taken on line $y$—$y$ of Fig. 2, and Fig. 5 is a top elevation of the complete cover.

Referring now to the drawings 1 indicates the circular cover and 2 a circular plate detachably connected thereto. The cover 1 is provided with a pendent marginal flange 3 and a slightly eccentric perforation 4 of a sufficient diameter to receive the head 5 of the centrally disposed screw 6 which secures the handle 7 to the plate 2, a shoulder 8 abutting said plate being provided in said screw. The center of curvature of the end of the slotted portion 9 extending radially from the perforation 4 in coincident with the center of the cover 1, and said slotted portion is adapted to receive the cylindrical portion 5 of the screw 6 after the head 5 is projected through the perforation 4. A stud 11 is provided on the cover 1, and an arc-shaped slotted portion 12 is formed in the plate 2 to register with said stud. A radially slotted portion 13 extending inwardly from the arc-shaped slotted portion 12 is provided to receive the stud 11 when the head 5 is projected through the perforation 4. The stud 11 will not register with the portion 12 and the portion 9 receive the screw 6 until the plate 2 slides radially into a position concentric with the cover 1. The plate 2 is free to rotate when in the concentric position, the ends of the portion 12 limiting such rotative movement. Three circular apertures 14 are formed in the plate 2, the same being spaced ninety degrees apart and equi-distant from the center of said plate. Three apertures 14' covered with wire gauze 16 are provided in the cover 1 which are adapted to register with the apertures 14 when the stud 11 is positioned at one end of the slotted portion 12, and when at the other end of said portion the apertures 16 are closed.

From the foregoing description it is easily seen that the openings for the escape of steam may be regulated as desired by simply turning the handle 7.

While I have shown what I deem to be the preferable form of my device, I do not wish to be limited thereto, as there might be slight changes made in the details of construction and arrangement of parts without departing from the spirit of my invention.

Having described my invention what I claim as new and desire to secure by Letters Patent is:

1. In a device of the class described, a cover and a circular plate detachably connected thereto, a central handle secured to said plate, a screw having a head depending from said handle and plate, said cover having an eccentric perforation adapted to receive said head and a radial slot extending from said perforation adapted to receive the cylindrical portion of said screw and a plurality of apertures in said plate and said cover adapted to be opened and closed by turning said plate, substantially as described.

2. In a device of the class described, a cover and a flange formed thereon, said cover being provided with an eccentric perforation having a slotted portion extending radially to the center of the cover, a stud secured to and projecting from said cover, a circular plate having a central knob or handle, a screw for securing said handle to said plate, a shoulder formed on said screw at a distance from the head thereof, said shoulder being adapted to abut said plate, the head of said screw being adapted to project through said perforation, said slotted portion being adapted to receive the cylindrical portion of said screw, there being openings in said plate and similar openings in said cover adapted to register therewith in one position, and said plate being provided with an arc-shaped slot having an inwardly radially extending portion adapted to engage said stud for limiting the rotative movement of said plate on said cover, substantially as described.

In testimony whereof I have signed my name to this specification in the presence of two subscribing witnesses.

DAVID P. X FOSTER.
his mark

Witnesses:
J. W. DWYER,
H. L. CHRISTENSEN.